Figure 1:
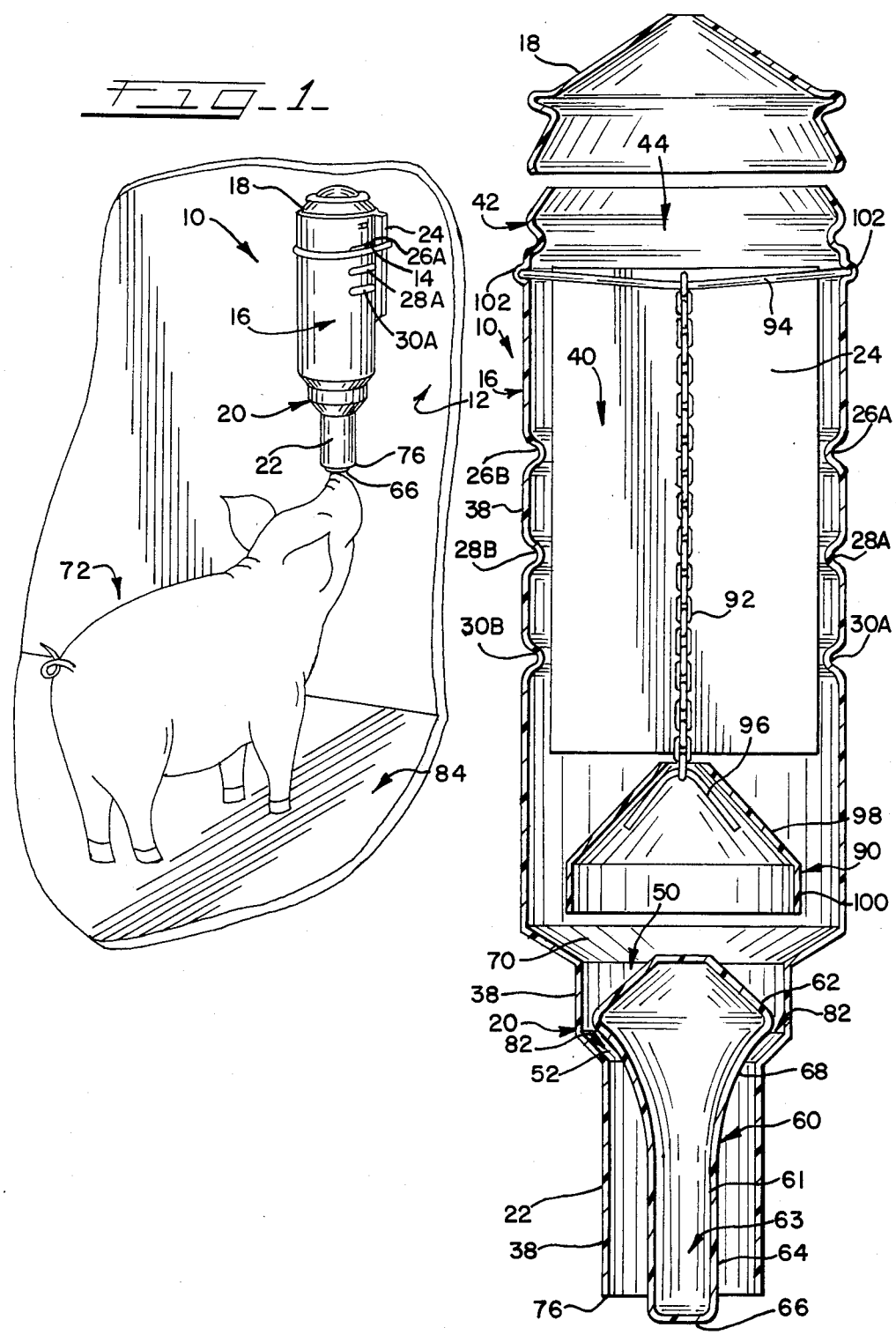

FARROWING CRATE CREEP FEEDER

DESCRIPTION

BACKGROUND OF THE INVENTION

This invention relates generally to devices used to store and dispense feed for domesticated animals and particularly such devices for weaning piglets from a sow.

In weaning piglets, farmers to date have either sporadically thrown a few hand fulls of creep, which is granular feed specially formulated for piglets, on the floor of the farrowing crate or pen for the piglets to clean-up. Alternatively, they have placed some feed in prior so-called pig pan or two-hole feeders. Both methods have exhibited inadequacies. Feed thrown on the farrowing crate floor often falls on or is carried into the areas where the piglets wet and dung, dirtying it and rendering the feed uneatable. This results in waste. Feed falling in the sleeping area of the farrowing crate also can be wasted because the extreme odors in a farrowing house quickly contaminate exposed feed rendering otherwise clean feed upalatable. This odor contamination problem becomes accentuated in recently developed feeds that have high milk content and that quickly absorb the foul environmental odors. Wasted feed, for course, adds to the cost of raising pigs for market and should be avoided. Lastly, the sporadic nature of the feeding makes the weaning process haphazard.

Placing feed in a prior pie pan or two-hole feeder keeps the feed off the farrowing crate floor, but often the piglets will wet or dung in the feeder, dirtying and ruining all of the feed contained therein. Further, these feeder devices, by design, expose much of the feed to the ambient atmosphere where it quickly picks up the foul odors present, making it taste bad. Again, the feed becomes wasted.

It is desirable, therefore, to obtain a piglet feeder that contains the feed separate from the environmental odors and dispenses the feed, upon demand, in a manner or to a location from which the piglets can eat without the feed becoming dirty or otherwise contaminated. Such a device also should accommodate the gradual nature of the weaning process in which the demand for feed at first is minimal and increases with time and should also use to advantage gravity-induced flow of feed through the feeder.

U.S. Pat. No. 1,309,090 to Henson discloses a pig feeding device using a control valve for gravity dispensing feed through a closeable opening at the bottom of a hopper. The control valve consists of a hollow outer cylindrical member spaced above and around the opening by legs extending to the bottom wall of the hopper. An inner cylidrical member, connected at its top with a depending control rod extending through the opening and accessible by a pig, opens and closes the space between the outer member and the opening in the bottom wall by telescoping into and out of the outer member. The inner member opens the space upon the pig pushing the control rod upwardly and closes the space by gravity pulling the inner member downwardly. Upward travel of the inner cylindrical member is limited by the height of the outer member and a separate guide rod retains the lower portion of the control rod against lateral movement. This device uses many fabricated parts that must be hand assembled to one another and the hopper, making it expensive, and presents a control valve of substantial weight that may be too heavy to be operated by a piglet.

U.S. Pat. No. 2,651,291 to Duke, in FIGS. 4, 5 and 6, discloses a stock feeder using a rocking valve for gravity dispensing feed from a hopper to a trough. The rocking valve comprises a disk that can be rocked from its seat, which is the top end of a dispensing conduit, by an animal pushing on a large roller mounted on the lower end of an acuating arm. The disk is maintained on its seat by upwardly projecting members, and the upward or backward travel of the lower end of the actuating arm is limited by the large roller striking the lower end of the dispensing conduit. This feeder also uses many fabricated parts that must be hand assembled to one another and the hopper, making it expensive, and dispenses feed into a trough that may be a convenient place for piglets to wet or dung.

SUMMARY OF THE INVENTION

The feeder device of the invention furnishes a plastic, blow molded, substantially cylindrical container with a single circumferential wall. The container is normally vertically mounted and is closeable with an inner chamber for storing granular feed placed therein fresh and free from the extreme odors present in a farrowing house. The feeder includes a single element, preferably molded, control valve that a piglet can easily lift to dispense feed from the chamber. This arrangement and reduction of parts reduces the cost of the feeder, obtains a simple operation, and requires little maintenance. The feeder reduces wasting feed by avoiding its contamination with odors or dirt and facilitates weaning the pigs with clean feed available upon demand.

The feeder has a top port, closeable with a snap-fitting cap, for charging an inner chamber with feed. A bottom port encloses the control valve and the culindrical wall of the bottom port provides in sequence a throat, an inverted conically surfaced valve seat and a narrower dispensing tube. The valve has a unitary circumferential wall defining a bulbous head and a depending cylindrical stem. The head presents a conically shaped under surface that narrows from the head's widest diameter to the diameter of the stem. This furnishes a large under surface that can substantially seal with or against the conically shaped valve seat even when the valve becomes angled from the longitudinal axis of the bottom port. The valve stem hangs in the delivery tube, and the cylidrical wall of the delivery tube maintains the valve substantially aligned along the longitudinal axis of the bottom port by limiting lateral movement of the stem from that axis.

A piglet or other animal dispenses feed from the feeder by pushing up on the bottom end of the stem, which hangs below the bottom edge of the delivery tube. This spaces the head from its seat and allows feed to fall from the chamber through the throat, past the valve head and seat and out the delivery tube. The distance the pig can move the valve along the longitudinal axis of the bottom port is limited by the pig's nose hitting the bottom edge of the dispensing tube. When the piglet releases the bottom end of the stem, the feeder stops dispensing feed; the valve drops under its own weight and that of the overlying feed in the chamber to seal against the seat and close the bottom port.

Figure 2:
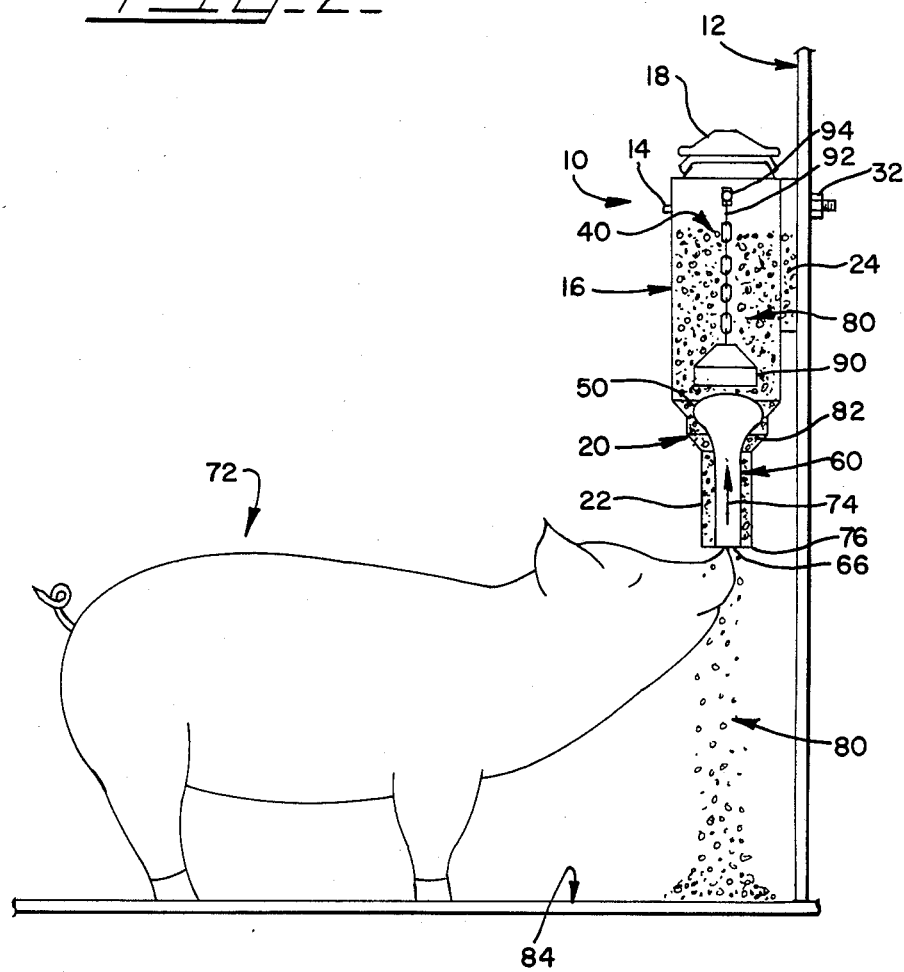

The container typically is mounted on the wall of the farrowing crate, in the sleeping area, by a large "U" bolt passing around the front of the container and being secured through the crate wall. The container wall of seat 52 and close the bottom port to further passage of the feed. Within the angle that the bottom end 66 of the valve stem can move within the delivery tube, the valve head substantially seals against the valve seat 52. Valve 60, in its normally closed position stopping the flow of feed through the bottom port, substantially prevents odors from passing upwardly into the feed stored in chamber 40. Referring to FIGS. 2 and 3, inside chamber 40, an umbrella 90 hangs suspended by a chain 92 and a rod 94 above and proximate the head 62 of the valve 60. The purpose of umbrella 90 is to relieve the valve 60 of at least some of the weight of the feed carried in chamber 40. This reduces the downward force or weight acting on the valve 60 and reduces the upward force that the piglet must exert to open the bottom port for dispensing feed from the feeder. The umbrella has a width substantially that of the thoat 50 and is suspended just above the lower inverted conical surface 70. Umbrella 90 is a hollow plastic member with a conical top 98 and cylindrical skirt 100 haning by a bent pin 96 passing through the bottom length of the chain 92. Rod 94 is fixed in position at the top chamber 40 by being jammed between the container wall forming the chamber. Preferably, the wall of the container can present two dimples 102 for receiving the ends of the rod 94. With this conical top and cylindrical skirt design, the feed maintains the umbrella 90 substantially centered in the bottom of the chamber 40, when the feeder is vertically arranged, so that the feed passes downwardly substantially evenly around the outside edges of umbrella 90.

Also in FIGS. 2 and 3, the flat portion 24 of cylindrical wall 38 communicates with chamber 40 and provides slightly increased volume for containing feed therein.

In the disclosed embodiment, the top cap 18, container 16, valve 60 and umbrella 90 all are formed of high-density polypropylene material that has been blow-molded to obtain the illustrated configuration. Other materials and methods can be used to obtain like or similar configurations.

The disclosed embodiment presents a lightweight, easily cleaned and lasting feeder immune from corrosion previously known with metal feeders. The feeder maintains the stored feed substantially closed from the odors of the farrowing house to keep the feed fresh. Further, without a trough, there is no place for the piglets to wet or dung in the feeder, With proper placement of the feeder in the sleeping area, the feed remains fresh and clean for the piglets to eat upon demand as they substantially wean themselves from their sow. All the farmer or breeder must do is periodically refill or recharge the feeder device with additional feed.

The design presents a minimum number of parts and only one moving part to effect the valving control. The piglet or other animal determines the quantity of feed demanded. Overall the device substantially reduces the waste of feed when weaning the piglets.

Of course, the feeder device can be used for animals other than piglets while obtaining substantially the same benefits.

The details of the disclosed embodiment can be varied while remaining within the scope of the invention defined in the claims. For example, the bottom port 20 could be formed without throat 50 so that the valve seat occurs as a portion of the conical surface 70. Additionally, the lower surface 68 of the valve head could be spherical or some other shape and still obtain the desired sealing with a like-shaped valve seat. Also, the thickness of the stem 64 and the diameter of the delivery tube 22 can be arranged so that the maximum skew of the valve in the bottom port maintains or obtains the desired seal against passage of feed therethrough.

The specifics of the top port and cap and side grooves can be altered as desired to obtain a like effect or function. Also the details of the flat portion 24 and the suspended umbrella, chain, rod and bent pin can be as desired.

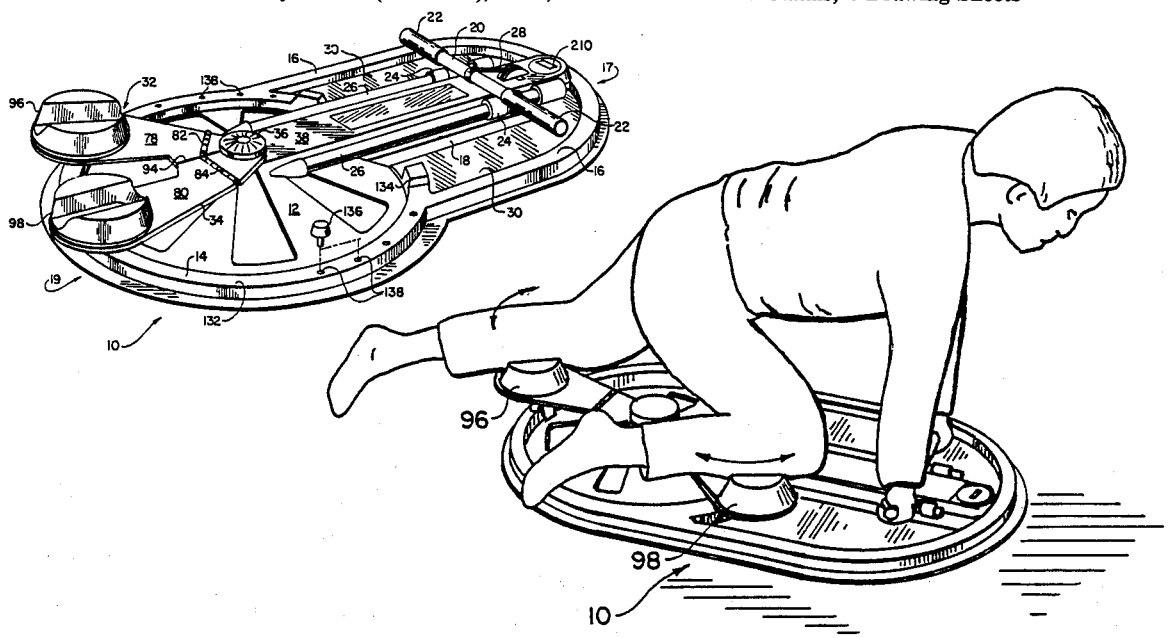

I claim:
1. An animal feeding device for containing granular feed placed therein and dispensing selected amounts of said feed upon demand by an animal, said device comprising:
   A. a container having a unitary cylindrical wall that forms an interior chamber adapted for containing said feed, a top port opening the chamber to exterior said container and adapted for passage of feed into said chamber, and a bottom port having a longitudinal axis, opening the bottom of said chamber to exterior said container and adapted for passage of feed from said chamber, a portion of said cylindrical wall at said bottom port presenting a circular interior valve seat and a narrower depending dispensing tube terminating at a bottom edge;
   B. a cap arranged over said top port normally used to close same;
   C. a unitary control valve freely floating at said bottom port, said valve having a head and a depending cylindrical stem, said head having a single valve-seat-engaging undersurface narrowing gradually from a widest diameter of said head to the narrower diameter of said stem, and said undersurface normally engaging along substantially all of said circular valve seat to close said bottom port, said stem hanging in said dispensing tube and said dispensing tube maintaining said valve stem substantially aligned with said longitudinal axis of said bottom port so that said undersurface of said head can normally engage with said valve seat, and said stem having a bottom end that extends below the bottom edge of said dispensing tube, said undersurface remaining engaged with said valve seat upon movement of said stem bottom end laterally of said longitudinal axis of said bottom port and said undersurface disengaging from said valve seat to open said bottom port upon movement of said stem bottom end substantially along said longitudinal axis of said bottom port, so that an animal demanding feed can push upwardly on the bottom end of said valve to space said undersurface from said valve seat and open said bottom port for dispensing feed from said chamber; and,
   D. an umbrella suspended at a fixed position in said chamber proximate and above said bottom port, said umbrella being adapted to carry at least some of the weight of said feed in said chamber and reduce the weight of said feed otherwise bearing on said valve head.

2. The feeding device of claim 1 in which said valve seat and said undersurface substantially define surfaces of an inverted cone.

3. The feeding device of claim 1 in which said cylindrical wall of said bottom port defines a throat depending from said chamber to said valve seat and substantially surrounding said valve head.

4. The feeding device of claim 1 in which said cylindrical wall forms a sloping portion at the bottom of said chamber for guiding feed therein to said bottom port.

5. The feeding device of claim 1 in which said bottom edge of said delivery tube limits the distance that said animal can push said valve upwardly.

6. The feeding device of claim 1 in which said valve has a unitary circumferential wall and is hollow.

7. The feeding device of claim 6 in which the circumferential wall of said valve is made of high density polyethylene.

8. The feeding device of claim 1 in which the cylindrical wall of said container forms at least one pair of grooves, each groove on opposite sides of said container, that can receive the legs of a "U" bolt for mounting the feeding device to a wall.

9. The feeding device of claim 8 in which there are three pairs of said grooves.

10. The feeding device of claim 1 in which said cylindrical wall of said container forms a flat portion that can engage against a wall to prevent rotation of said feeding device thereagainst.

11. The feeding device of claim 10 in which said flat portion of said cylindrical wall of said container communicates with and extends from said chamber.

12. The feeding device of claim 1 in which said cap and top port engage in a snap fit.

13. The feeding device of claim 1 including a support carrying said umbrella and said support includes a rod jammed between opposed parts of the cylindrical wall of said container in said chamber, and a chain hanging from said rod and carrying a pin in turn carrying said umbrella.

14. The feeding device of claim 13 in which said opposed parts of said cylindrical wall include dimples for receiving the ends of said rod jammed therebetween.

15. The feeding device of claim 1 in which said umbrella is a downwardly opening, hollow, unitary piece with a conical top part and a depending cylindrical skirt.

16. The feeding device of claim 1 in which said cylindrical wall of said container is made of high density polyethylene.

17. The feeding device of claim 1 in which said umbrella is made of high density polyethylene.

18. An animal feeding device for containing granular feed placed therein and dispensing selected amounts of said feed upon demand by an animal, said device comprising:

A. container means for forming an interior chamber adapted to contain said feed, said container means including a bottom port for dispensing feed from said chamber under gravity flow, said bottom port including a circular valve seat at said chamber and a narrower depending delivery tube terminating at a bottom edge;

B. control valve means freely floating at said bottom port for opening and closing said bottom port, said valve means having an undersurface normally engaging along substantially all of said circular valve seat to close said bottom port, and having a stem depending from said under surface and hanging in said dispensing tube to present a bottom end extending below said bottom edge of said dispensing tube, said undersurface remaining engaged with said valve seat upon movement of said stem bottom end laterally of said dispensing tube and disengaging from said valve seat upon movement of said stem bottom end longitudinally of said dispensing tube; and C. umbrella means suspended at a fixed position in said chamber for carrying at least some of the weight of the feed adapted to be contained in said chamber that otherwise would bear on said control valve means.

* * * * *

United States Patent [19]

Iams et al.

[11] Patent Number: 4,799,475

[45] Date of Patent: Jan. 24, 1989

[54] DEVICE PERMITTING A USER TO SIMULATE CRAWLING MOTIONS TO IMPROVE MOVEMENT OF THE TRUNCAL MUSCLES AND SPINE

[75] Inventors: John F. Iams, Poway; Robson L. Splane, Jr., Granada Hills; John A. Drusch, III, Escondido, all of Calif.

[73] Assignee: Superspine, Inc., Poway, Calif.

[21] Appl. No.: 844,073

[22] Filed: Mar. 25, 1986

[51] Int. Cl.$^4$ .............................................. A61H 1/02
[52] U.S. Cl. .................................. 128/25 R; 434/255; 272/146; 272/903
[58] Field of Search ...................... 272/70, 71, 93, 127, 272/134, 136, 144, 146, 903; 128/25 R; 434/254, 255

[56] References Cited

U.S. PATENT DOCUMENTS

| | | | |
|---|---|---|---|
| 1,620,146 | 3/1927 | Walton | 272/71 |
| 2,019,224 | 10/1935 | Hess | 272/71 |
| 3,362,090 | 1/1968 | Adam | 434/255 |
| 3,363,335 | 1/1968 | Burans et al. | 434/255 |
| 3,460,272 | 8/1969 | Pellicore | 434/255 |
| 3,538,911 | 11/1970 | Emmons | 128/25 R |
| 3,568,666 | 3/1971 | Dunn | 128/25 R |
| 3,582,069 | 6/1971 | Flick | 434/255 |
| 3,589,720 | 6/1971 | Agamian | 272/80 |
| 3,759,511 | 9/1973 | Zinkins et al. | 272/70 |
| 3,912,262 | 10/1975 | Micko | 272/144 |
| 3,976,058 | 8/1976 | Tidwell | 128/25 R |
| 4,324,399 | 4/1982 | Rickey | 272/144 |
| 4,422,634 | 12/1983 | Hopkins | 272/71 |

OTHER PUBLICATIONS

"The Auto-Trac Table"-advertising brochure-dated 1985,-Marked Patent Pending.
Advertising brochure for "Exer-Cor Cross Pattern Creeper"-(1985) European-origin device referred to on p. 3 of Specification.
R. Cailliet, *Low Back Pain Syndrome* (Edition 3), ch. 4, pp. 79-106, [Note esp. FIGS. 61, 62, 64 and 67-69], (1981).

Primary Examiner—V Millow
Assistant Examiner—J. Welsh
Attorney, Agent, or Firm—Stanley A. Becker; William C. Fuess

[57] ABSTRACT

An apparatus permits a user to simulate crawling motions and provides enhanced movements of the person's truncal spinal muscles and joints. The apparatus comprises a flat base for supporting a person in position where there is minimal axial gravity loading of the spine, and hand and knee rests respectively fixed and pivoting relative to the flat base to permit relative motion between axial portions of the spine trunk, especially the upper (thoracic) and lower (pelvic) portions of the person's trunk, while the person remains in the gravity unloaded position. The base mounts a fixed rest and a pivoting or swiveling rest, the swiveling rest comprising a pair of pivoted supports which can move in circular lateral paths independent of each other. In the preferred embodiment the user assumes an all fours position and by kneeling or leaning on the swiveling rest engages in a crawling motion alternating movements of each leg or arm, which causes the upper and lower portions of the trunk to move relative to each other. Normal motion is simultaneously in the frontal and traverse planes of the body. Movement in the transverse plane can be enhanced by incorporating a sloped structure for the swiveling rest of the device to follow. Simultaneous movement in the sagittal plane can also be obtained by having the user flex or extend his body during the exercise. The supports for the hands and knees can be mounted on the same base, mounted in a telescoping or adjustable fashion or positioned in separate but adjacent locations. Extra support can be used if a person is unable to support one or another portion of his body on his own. The pivoting supports can be moved either by the person's own exertions or his exertions can be separately assisted by air cylinders or other means.

22 Claims, 4 Drawing Sheets